United States Patent
Song

(10) Patent No.: US 6,257,598 B1
(45) Date of Patent: Jul. 10, 2001

(54) CHILDREN'S CYCLE

(75) Inventor: Zhenghuan Song, Jiangsu (CN)

(73) Assignee: Jiangsu Goodbaby Group, Inc. (CN)

( * ) Notice: Subject to any disclaimer, the term of this patent is extended or adjusted under 35 U.S.C. 154(b) by 0 days.

(21) Appl. No.: 09/206,050

(22) Filed: Dec. 4, 1998

Related U.S. Application Data

(63) Continuation-in-part of application No. PCT/CN97/00059, filed on Jun. 11, 1997.

(30) Foreign Application Priority Data

Apr. 22, 1997 (CN) .................................................. 97106399
Jun. 11, 1997 (CN) .................................................. 96230036

(51) Int. Cl.[7] .................................................. A63C 17/18
(52) U.S. Cl. .......................... 280/7.1; 280/7.12; 280/30; 280/62
(58) Field of Search .................................. 280/7.1, 7.12, 280/7.15, 7.17, 9, 30, 87.01, 47.18, 62; 297/272.1, 133

(56) References Cited

U.S. PATENT DOCUMENTS

| | | | |
|---|---|---|---|
| 251,601 | * 12/1881 | Keeler | 280/30 |
| 1,915,234 | * 6/1933 | Magusin | 280/30 |
| 2,499,531 | * 3/1950 | Sever | 280/7.17 |
| 3,010,731 | * 11/1961 | Kenney | 280/9 |
| 3,161,417 | * 12/1964 | Goldfarb | 280/30 |
| 3,485,507 | * 12/1969 | Christof | 280/202 |
| 4,055,060 | * 10/1977 | Bellino | 70/234 |
| 5,104,179 | * 4/1992 | Jones | 297/3 |
| 5,277,227 | * 1/1994 | Bradshaw et al. | 138/110 |
| 5,468,006 | * 11/1995 | Delserro | 280/62 |
| 5,499,835 | * 3/1996 | Skirchak, Jr. et al. | 280/62 |
| 5,503,411 | * 4/1996 | Sundberg et al. | 280/30 |
| 5,630,778 | * 5/1997 | Barreca | 482/140 |

FOREIGN PATENT DOCUMENTS

2051607 * 1/1990 (CN) .
2069821 * 1/1991 (CN) .

* cited by examiner

Primary Examiner—Daniel G. DePumpo
(74) Attorney, Agent, or Firm—Lyon & Lyon LLP

(57) ABSTRACT

A children's cycle comprising frames, wheels under the frames and a push-handle connected with the frames. The push-handle is arcuate in shape and movably connected with the frames. The push-handle may be turned down to the underside of the cycle body with its arcuate concave facing upward so that the cycle body is supported by the push-handle. The push-handle may be used for pushing or pulling the cycle, and may be turned down to the underside of the cycle body for rocking the cycle forward and backward.

21 Claims, 3 Drawing Sheets

CHILDREN'S CYCLE

I. RELATED APPLICATIONS

This is a continuation-in-part of PCT application PCT/CN97/00059 filed Jun. 11, 1997, which claims the priority benefit of Chinese application serial no. 96230036.5 filed Jun. 11, 1996, Chinese application serial no. 97106399.0 filed Apr. 22, 1997.

II. FIELD OF THE INVENTION

The present invention relates to a children's cycle.

III. BACKGROUND OF THE INVENTION

Generally, a children's cycle comprises frames and wheels. Sometimes the cycle further includes a push-handle erected at the back of the tricycle for pushing the cycle. Usually, a children's cycle can not be used as a rocker such as a rocking horse.

IV. SUMMARY OF THE INVENTION

The present invention features a children's cycle which can be used as a rocker such as a rocking horse.

A children's cycle according to the present invention comprises frames, wheels under the frames and pedals for rotating the wheels. The frames include a front frame and a rear frame rotatably connected by a shaft. In a preferred embodiment, a front fork is provided under the front portion of the front frame. A front wheel is provided on the front fork. A left handlebar and a right handlebar are provided (preferably symmetrically) on the upper portion of the front frame. A saddle is provided above the middle portion of the rear frame.

In a preferred embodiment, the children's cycle is a tricycle wherein a left rear wheel and a right rear wheel are (preferably symmetrically) provided at each side under the rear portion of the rear frame.

An arcuate bottom rack is movably connected to the cycle body. When the arcuate bottom rack is provided under the frames, it bows downward and contacts the ground and supports the cycle body composed of the frames and wheels. When the arcuate bottom rack is moved away from the underside of the cycle body, the cycle body is supported by the wheels.

The present invention has the following advantages over other children's cycles:

1) With the arcuate bottom rack bowing downward under the frames, the children's cycle functions as a rocker;

2) When the arcuate bottom rack is moved away from the underside of the frames so that the wheels touch the ground, the subject of the present invention functions as a children's cycle. When the arcuate bottom rack is moved to the back of the frames, it can be used as a push-handle.

The above object and features, as well as other features of the present invention are described further in the detailed description of the invention with reference to the drawings.

V. BRIEF DESCRIPTION OF THE DRAWINGS

Figure 1:
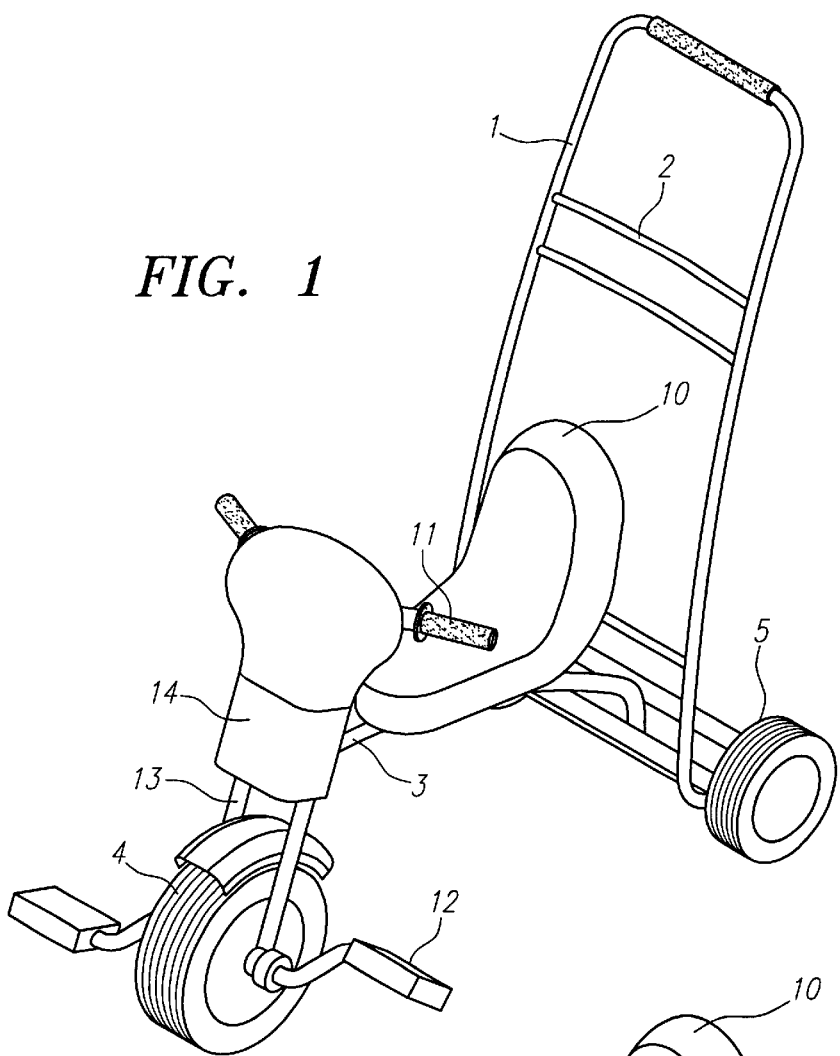
FIG. 1 is a perspective view showing a children's tricycle according to the present invention which can be pushed by hand.

The parts shown in these drawings are numbered as follows: (1) arcuate bottom rack, (2) transverse bars, (3) rear frame, (4) front wheel, (5) rear wheels, (6) rear axle, (7) spring, (8) head of an inserted pin, (9) inserted pin, (10) saddle, (11) handlebars, (12) pedals, (13) front fork, (14) front frame, (15) protection sheath, (16) opening, (17) spring, (18) hook, (19) hook pin, (20) shaft, (21) attaching rope, (22) inserted pin, (23) storing hole for the inserted pin, (24) front axle.

VI. DETAILED DESCRIPTION OF THE INVENTION

In reference to the figures, a children's cycle according to the present invention comprises front and rear frames 3 and 14, front wheels 4 and 5 mounted under the frames, and a pair of pedals 12 for rotating the wheels. The pedals 12 may be connected to the front axle 24 of the front wheel 4 by a crank (when the frames are those of a tricycle as illustrated herein), or may be connected to a chain wheel by a crank while the chain wheel in turn is connected to the rear axle 6 by a chain transmission (when the frames are those of a bicycle). The frames comprise a front frame 14 and a rear frame 3. The front frame 14 and the rear frame 3 are rotatably connected to each other by a shaft 20. A front fork 13 is provided under the front portion of the front frame 14. A front wheel 4 is provided on the front fork 13. A left handlebar and a right handlebar 11 are provided (preferably symmetrically) on the upper portion of the front frame 14. A saddle 10 is provided approximately above the middle portion of the rear frame 3. A left rear wheel and a right rear wheel 5 are provided (preferably symmetrically) under the rear portion of the rear frame 3.

In addition to the structure in a children's tricycle or a children's bicycle as described above, the children's cycle according to the present invention has the following features: An arcuate bottom rack 1 is provided under the frames and the wheels. The rack 1 contacts the ground so as to support the cycle body, and the children's cycle can be used as a rocker. The arcuate bottom rack 1 is movably connected to the cycle body so that when the arcuate bottom rack 1 is moved away from the underside of the cycle body the cycle body is supported by the wheels and the cycle functions as a tricycle or a bicycle.

When the subject of the invention is used as a cycle, the arcuate bottom rack 1 can be a separate accessory member and be separated from the cycle body. In this design, the arcuate bottom rack 1 is connected to the frames only when the cycle is used as a rocker. Alternatively, such as shown in FIG. 1, the arcuate bottom rack 1 may be designed such that its rear portion is movably connected to the lower rear portion of the rear frame 3. When the arcuate bottom rack 1 is moved to the back of the rear frame 3 and is erected upright there, the arcuate bottom rack 1 can be used as a push-handle for pushing the cycle. The latter is a preferred design.

There are different ways of connecting the arcuate bottom rack to the frames. One example is a plug-in connection between the rear portion of the arcuate bottom rack 1 and the rear frame 3. When the arcuate bottom rack 1 is moved to the back of the rear frame 3 and erected there, the lower portion of the arcuate bottom rack 1 is in a plug-in connection with the rear frame 3. Different insertion holes are used with different functional positions of the arcuate bottom rack 1.

In particular, insertion holes that are slightly larger than the ends of the arcuate bottom rack are formed in the lower portion of the rear frame 3. The ends of the arcuate bottom rack 1 are inserted in one of the insertion holes so that a plug-in connection is achieved. To change the functional positions of the cycle, the arcuate bottom rack 1 is withdrawn from one insertion hole and then is inserted into another hole, so that the arcuate bottom rack 1 is erected at the back of the rear frame 3. The arcuate bottom rack 1 may also be used as a back support when it is positioned at the back of the rear frame 3. Another way for connecting the arcuate bottom rack to the frames is an articulate connection. The rear portion of the arcuate bottom rack 1 is articulated to the rear portion of the rear frame 3 such that the arcuate bottom rack 1 may be rotated around relative to the rear frame 3 so as to obtain different functional positions.

Figure 3:
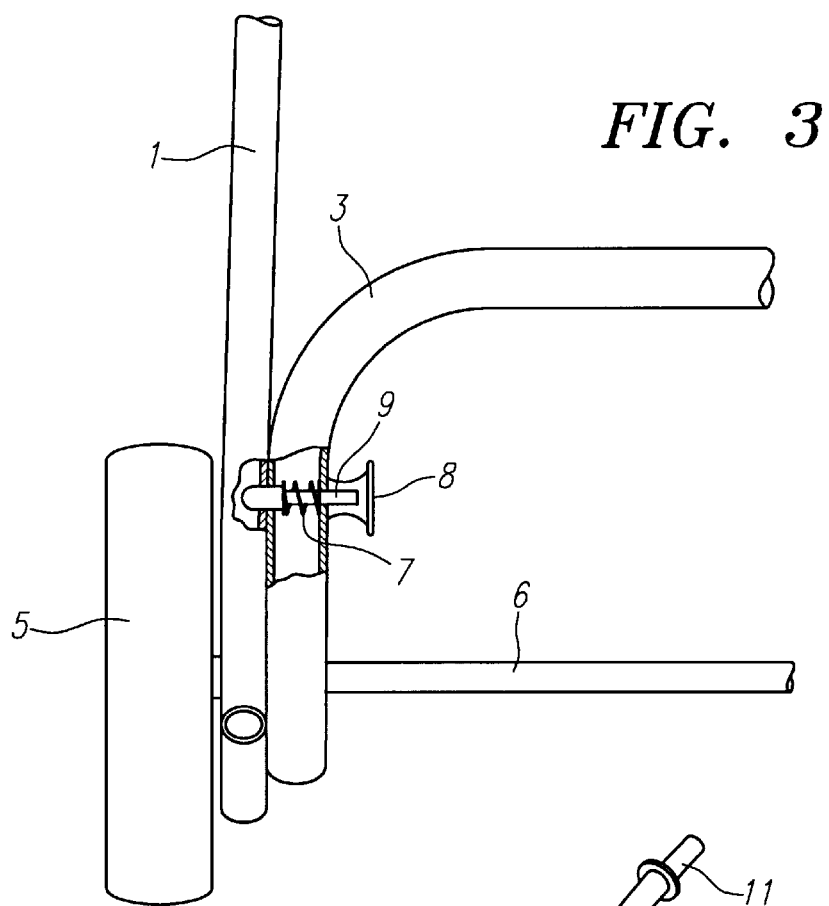
FIG. 3 is a view showing the lock for locking the arcuate bottom rack to the rear frame when the arcuate bottom rack is moved to the back of the rear frame so as to be used as a push-handle.

A lock is provided to hold the rear frames 3 and the arcuate bottom rack 1 together when the arcuate bottom rack 1 is erected at the back of the rear frame 3. An example is shown in FIG. 3 in which an inserted pin 9 with a head 8 is provided in the rear frame 3. The inserted pin 9 is inserted in a hole formed in the arcuate bottom rack 1 and is slidable in the left-and-right direction.

Figure 5:
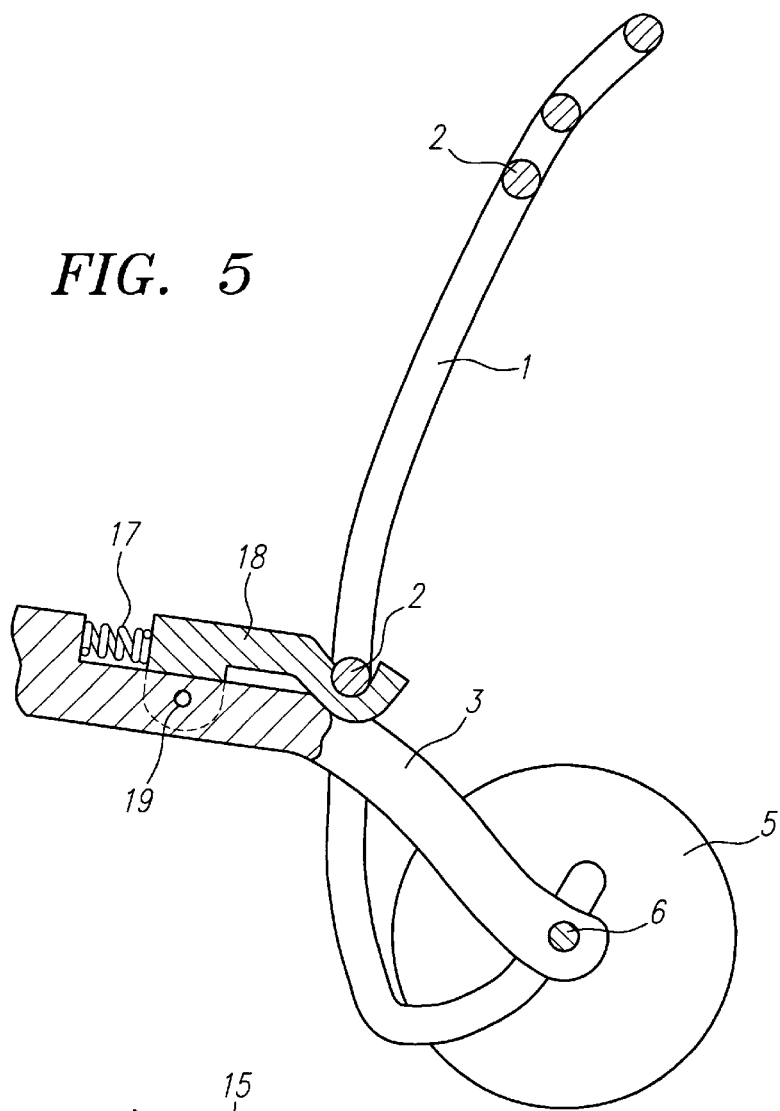
FIG. 5 is view showing an alternative way for locking the arcuate bottom rack to the rear frame when the arcuate bottom rack is moved to the back of the rear frame so as to be used as a push-handle.

Another example is shown in FIG. 5 in which a hook 18 is movably connected to the rear frame 3. The hook 18 catches the transverse bars 2 of the arcuate bottom rack 1. Other kinds of locks are also applicable.

In a preferred embodiment, the arcuate bottom rack 1 includes two arcuate side bars bowing downward and transverse bars connecting the side bars. When the arcuate bottom rack 1 is moved to the underside of the cycle body, the front wheel 4 rests on the transverse bars 2 (see FIG. 2). The rear portion of the arcuate bottom rack 1 is articulated to the rear axle 6 of the rear wheels 5. The front portion of the arcuate bottom rack 1 is used to support the front portion of the frames or to support the front wheel 4. The rear portion of the arcuate bottom rack 1 is used to support the rear wheels 5 or to support the rear portion of the frames.

Figure 4:
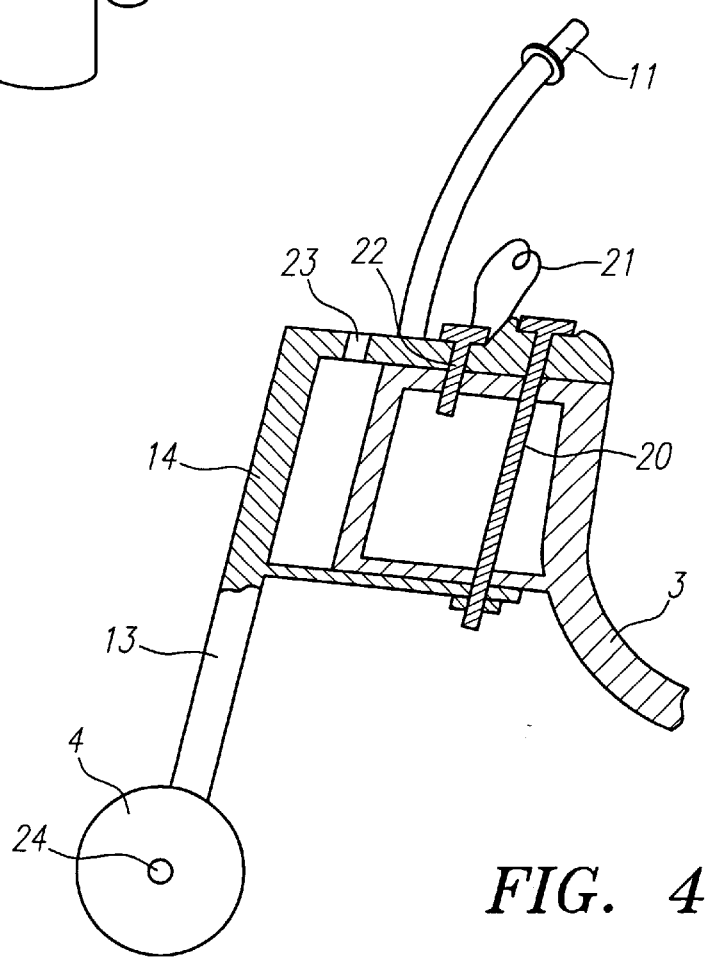
FIG. 4 is a sectional view showing that the front frame is connected to the rear frame by a shaft, and that the front frame and the rear frame are connected by a locking means.

When the cycle is used as a rocker, it is desirable for safety reasons to prevent relative rotation between the front frame 14 and the rear frame 3 with a lock. For example, (see FIG. 4.), an insertion hole is formed in the front frame 14, and a corresponding insertion hole is also formed in the back frame 3 which is aligned with the former hole. A rotation-preventing pin 22 is inserted in the insertion holes formed in the front frame 14 and the rear frame 3. The pin 22 is attached to the front frame 14 by an attaching rope 21. A storing hole 23 for the inserted pin is formed in the front frame 14. When the front frame 14 is not locked with the rear frame 3, the pin 22 is kept in the storing hole 23. Other kinds of locks are usable with the cycle of this invention.

Figure 6:
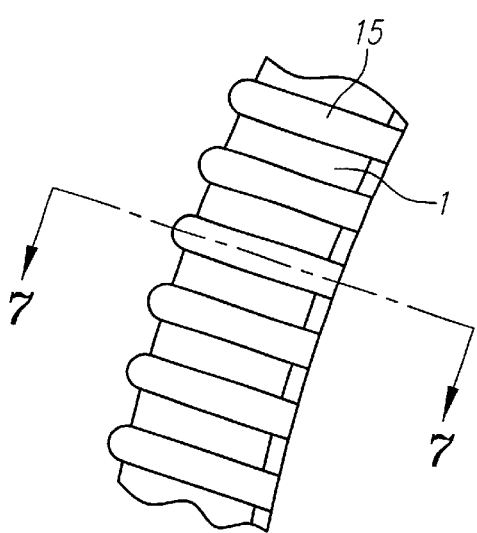
FIG. 6 is an outside view showing a length of a side bar of the arcuate bottom rack.
Figure 7:
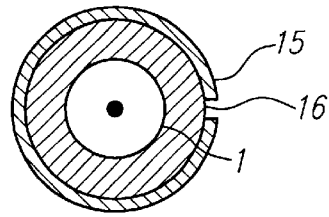
FIG. 7 is a sectional view taken along the A-A direction in the FIG. 6.

A protection sheath 15 can be provided on the arcuate bottom rack 1 so as to prevent the arcuate bottom rack 1 from being worn out (see FIGS. 6 and 7). There is an opening 16 formed on the sheath 15 which is open longitudinally for replacing the sheath 15. Spaced ribs can be formed on the sheath 15 and extend peripherally. This design reduces the amount of the materials needed to make the sheath 15.

Preferably, the arcuate bottom rack 1 is U-shaped and the ends of its opening are articulated with the rear portion of the rear frame 3. The opening of the arcuate bottom rack 1 becomes gradually wider backward so as to obtain a better stability of the arcuate bottom rack 1 and therefore the child will not turn over sideward when he rides on the cycle. The ends of the opening of the arcuate bottom rack 1 are articulated to the rear axle 6 at the inner sides of the rear wheels 5. The ends of the opening of the arcuate bottom rack 1 extend backward under the axle 6, and they go beyond the rear axle 6 (so that the arcuate bottom rack 1 may be extended and the curvature of the rack 1 may be reduced for the sake of safety), and then bend upward and forward so as to form a curve section. The ends of this curve section is articulated with the rear axle 6 when the arcuate bottom rack 1 is erected at the back of the rear frame 3, it may stand upright or slant.

Figure 2:
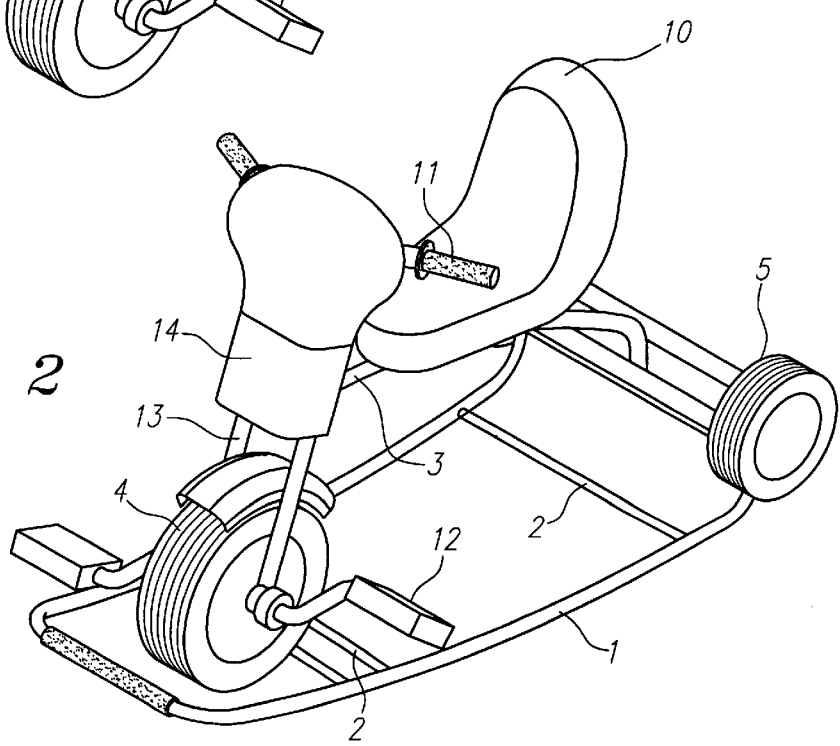
FIG. 2 is a perspective view showing the children's tricycle in which the push-handle is turned downward to the underside of the cycle body so that the tricycle can be used as a rocker.

The frames shown in FIGS. 1 and 2 are those of a tricycle, however, the present invention is also applicable to a children's bicycle. In a children's bicycle, a pair of small rear wheels can be installed on both sides of a single large wheel to prevent the bicycle from turning over sideward. When the bicycle is used as a rocker, the small rear wheels can be designed to rest on the arcuate bottom rack 1 in the same way as the rear wheels of a tricycle do.

Other embodiments of this invention are disclosed in the following claims. As will be obvious to those skilled in the art, variations and modifications may be made without departing from the spirit and scope of the invention.

What is claimed is:

1. A cycle comprising frames, wheels under the frames and pedals for rotating the wheels, said frames including a front frame and a rear frame which are rotatably connected by a shaft; a front fork provided under the front portion of said front frame, a front wheel provided on said front fork, and a left handlebar and a right handlebar provided on the upper portion of said front frame; a saddle provided above the middle portion of said rear frame, and a left rear wheel and a right rear wheel provided at each side under the rear portion of said rear frame, a rear axle supporting said wheels and interposed therebetween; an arcuate bottom rack having a rear portion rotatably connected to said rear axle and a front portion distal of said rear portion; wherein said arcuate bottom rack bows downward when under the frames and the arcuate bottom rack contacts the ground and supports the cycle body composed of the frames and wheels; and when the arcuate bottom rack is moved away from the underside of the cycle body, the cycle body will be supported by the wheels.

2. The cycle of claim 1, wherein the rear portion of said arcuate bottom rack is movably connected with the lower rear portion of said rear frame, and said arcuate bottom rack functions as a push-handle connected with said rear axle and rear frame when said arcuate bottom rack is rotated to the back of said rear frame and erected there.

3. The cycle of claim 2, further comprising a lock that holds together said rear frame and said arcuate bottom rack when said arcuate bottom rack is erected at the back of said rear frame as a push-handle.

4. The cycle of claim 2, wherein the rear portion of said arcuate bottom rack is articulated with the rear portion of said rear frame.

5. The cycle of claim 3, wherein said lock comprises an insertion pin provided in said rear frame and slidable in a direction substantially parallel to said rear axle, said insertion pin being inserted in a hole formed in said rear frame.

6. The cycle of claim 3, wherein said lock comprises a hook movably connected with said rear frame and catching said arcuate bottom rack.

7. The cycle of claim 4, wherein said arcuate bottom rack comprises two arcuate side bars bowing downward and a plurality of transverse bars connecting said two arcuate side bars, and said front wheel rests on said transverse bars when said arcuate bottom rack is under the cycle body.

8. The cycle of claim 2 or 4, wherein the rear portion of said arcuate bottom rack is articulated with said rear axle.

9. The cycle of claim 1, wherein the front portion of said arcuate bottom rack is used to support the front portion of the frames or the front wheel and the rear portion of said arcuate bottom rack is used to support the rear wheels or the rear portion of the frames.

10. The cycle of claim 2, wherein a first plug-in connection is achieved between the rear portion of said arcuate bottom rack and said rear frame when said arcuate bottom rack supports the cycle body, and a second plug-in connection is achieved between the rear portion of said arcuate bottom rack and said rear frame when said arcuate bottom rack is moved to the back of said rear frame and erected there.

11. The cycle of claim 1, further comprising a lock provided between said front frame and said rear frame to prevent relative rotation between said front frame and said rear frame.

12. The cycle of claim 1, wherein said arcuate bottom rack is covered with a protection sheath.

13. The cycle of claim 11, wherein said lock comprises an insertion hole formed in said front frame, and a corresponding insertion hole formed in said rear frame in alignment with the former insertion hole, and a pin insertable into said insertion holes formed in said front frame and rear frame to prevent said rotation.

14. The cycle of claim 13, wherein said insertion pin is attached to said front frame by an attaching rope, and a storing hole for the inserted pin is formed in said front frame.

15. The cycle of claim 12, wherein an opening is formed longitudinally on said sheath.

16. The cycle of claim 12, wherein spaced ribs are formed on said sheath and extend peripherally.

17. The cycle of claim 1, wherein said pedals are connected to a front axle of said front wheel by a crank.

18. The cycle of claim 4, wherein said arcuate bottom rack is U-shaped and the ends are articulated with the rear frame.

19. The cycle of claim 18, wherein said opening of said arcuate bottom rack becomes gradually wider backward, and the ends of said opening of said arcuate bottom rack are articulated to the rear axle of said rear wheels.

20. The cycle of claim 19, wherein the ends of the opening of said arcuate bottom rack extend backward under the rear axle and go beyond said axle, then bend upward and forward so as to form a curve, the ends of said curve are articulated with the rear axle.

21. A cycle comprising frames, wheels under the frames, pedals for rotating the wheels, a rear axle supporting a rear pair of said wheels and interposed therebetween, and an arcuate bottom rack bowing downward and having a rear portion rotatably connected to said rear axle, wherein: (a) said arcuate bottom rack contacts the ground and supports said frames and wheels, and (b) when said arcuate bottom rack is moved away from the underside of the frames and wheels, said cycle is supported by the wheels.

* * * * *